2,797,155
BENEFICIATION OF NICKEL-CONTAINING IRON ORES

Harry H. Vaughan, Ishpeming, Mich., assignor to Jones & Laughlin Steel Corporation, Pittsburgh, Pa., a corporation of Pennsylvania No Drawing. Application March 5, 1954,
Serial No. 414,499

7 Claims. (Cl. 75—1)

This invention relates to the beneficiation of iron ores containing a minor proportion of nickel and is more particularly concerned with that class of iron ores known as "laterites." Such ores contain iron in the form of hematite and small amounts of nickel in the form of oxides or silicates or both. If ores of this type are smelted in a blast furnace in the conventional manner, the nickel alloys with the iron. For many purposes this nickel content is undesirable and such ores must be treated to remove or substantially reduce their nickel contents before they are adapted for blast furnace reduction.

It is known that both the iron and nickel contents of laterites and similar ores react readily with chlorine or chloridizing agents. The iron in such ores reacts with the chlorine at a lower temperature than does nickel so that it is not too difficult to remove a large proportion of the iron content as a chloride. If this chloridizing reaction is carried on at a relatively low temperature, most of the chlorides formed remain solids, and being soluble in water, may be leached out with hot water. If the reaction is caused to take place at higher temperatures, both the iron and nickel chlorides formed volatilize and may be separated by selective condensation. In either case the problem of removing a substantial proportion of the nickel content without losing too much of the iron content is formidable and such chloridizing processes have not been commercially successful.

I have found that the chloridizing of laterite ores may be carried out so as to remove a very substantial proportion of the nickel content as a volatile compound without reacting more than a small fraction of the iron content. My process thus makes it possible to beneficiate laterites by selectively chloridizing the contained nickel which is carried off in its volatile form. This nickel may be recovered, if desired, by conventional processes and the chlorine which reacts with it reused.

It is an object therefore of my invention to provide a process for beneficiating iron ores containing nickel by selectively reacting the nickel with chlorine and removing it as a volatile compound. Other objects will appear in the course of the description of my process, which follows.

I have discovered that the reaction between chlorine and nickel-containing iron ore can be made selective with respect to nickel if the chlorine is first mixed with oxygen to form an atmosphere in which the volume of chlorine is less than the volume of oxygen. If the iron ore to be treated is heated to a temperature above that at which nickel chloride compounds volatilize and caused to react with the oxygen-chlorine atmosphere above described, a proportion of the contained nickel exceeding 90% if desired can be converted into volatile chloride and removed as a gas with a loss of only a few percent of the iron content of the ore.

My process is preferably carried out in the following manner. A quantity of ore is placed in a closed chamber or retort and heated by any convenient means to a temperature above about 900° centigrade, but in general not exceeding about 1100° centigrade. As will be shown, the optimum temperature to which the ore should be heated is correlated with the composition of the oxygen-chlorine atmosphere. An oxygen-chlorine atmosphere is formed by mixing these two gases in the desired proportions and is introduced into the chamber and caused to flow through it in contact with the heated ore. The chlorine reacts with the contained nickel to form volatile nickel compounds which are carried off with the atmosphere leaving the chamber. Fresh oxygen-chlorine atmosphere is constantly introduced into the chamber and the reacted atmosphere together with the products of reaction is constantly exhausted so that the composition of the reacting atmosphere within the reacting chamber is substantially constant. I have found that in general more than half of the contained nickel which will react with the chlorine in the atmosphere does so in a few minutes and that substantially all the contained nickel which will react with the atmosphere of chosen composition at the chosen temperature does so within about an hour, if the ore is fully exposed to the atmosphere. The iron, on the other hand, reacts much more slowly and at an approximately constant rate. By varying the heating temperature and the composition of the oxygen-chlorine atmosphere, almost any desired degree of beneficiation may be obtained.

The following examples illustrate the operation of my process. In each case the ore treated was a lateritic hematite having the following principal constituents:

| | Percent |
|---|---|
| Fe | 45.87 |
| Ni | 0.53 |
| $Cr_2O_3$ | 2.30 |
| $Al_2O_3$ | 13.66 |

In each case the ore was heated to the indicated temperature and maintained at that temperature for sixty minutes, and the atmosphere caused to flow through the retort during that time at a rate between about 5,000 and 6,000 liters per hour per kilogram of ore.

EXAMPLE 1

The atmosphere used consisted of 8 parts by volume of chlorine to 10.4 parts of oxygen. The results obtained at several temperatures are set out in Table I.

Table I

| Roast Temp., °C. | Residue Assays | | Percent Removed | |
|---|---|---|---|---|
| | Percent Fe | Percent Ni | Fe | Ni |
| 800 | 52.39 | .30 | 7.1 | 53.7 |
| 900 | 51.77 | .15 | 17.2 | 79.2 |
| 950 | 49.86 | .06 | 25.6 | 92.3 |
| 1,000 | 47.25 | Trace | 38.4 | 99 |

EXAMPLE 2

The conditions here duplicated those of Example 1 above except that the atmosphere consisted of chlorine and atmospheric air in proportion such that the volumetric ratio between the chlorine and the oxygen was equivalent to that of Example 1. This corresponded to a volumetric ratio of chlorine to air of 8 to 52. The results obtained duplicated those tabulated above. This experiment thus showed that the nitrogen and minor constituents of air had no effect whatever on my process, and that an atmosphere of air and chlorine reacted in the same way as an atmosphere of oxygen and chlorine.

EXAMPLE 3

The atmosphere here used comprised 4 parts of chlorine to 52 parts of air. Results at various temperatures are found in Table II.

Table II

| Roast Temp., °C | Residue Assays | | Percent Removed | |
|---|---|---|---|---|
| | Percent Fe | Percent Ni | Fe | Ni |
| 800 | 53.61 | .30 | 3.0 | 53.0 |
| 900 | 53.15 | .18 | 8.5 | 73.2 |
| 1,000 | 50.93 | .04 | 21.6 | 94.7 |

EXAMPLE 4

The atmosphere here used was 2 parts of chlorine to 52 parts of air. The results at several temperatures are set out in Table III.

Table III

| Roast Temp., °C | Residue Assays | | Percent Removed | |
|---|---|---|---|---|
| | Percent Fe | Percent Ni | Fe | Ni |
| 800 | 53.38 | .36 | 1.8 | 42.7 |
| 900 | 53.46 | .20 | 4.3 | 69.0 |
| 1,000 | 52.92 | .07 | 10.9 | 89.8 |
| 1,050 | 51.54 | Nil | 18.0 | 99 |
| 1,100 | 50.62 | Nil | 24.1 | 99 |

EXAMPLE 5

The atmosphere in this experiment was one part of chlorine to 52 parts of air. The results are tabulated in Table IV.

Table IV

| Roast Temp., °C | Residue Assays | | Percent Removed | |
|---|---|---|---|---|
| | Percent Fe | Percent Ni | Fe | Ni |
| 800 | 53.45 | .35 | 0.6 | 43.7 |
| 900 | 53.37 | .23 | 2.1 | 63.6 |
| 1,000 | 52.91 | .13 | 5.6 | 80.0 |
| 1,050 | 52.91 | .05 | 7.8 | 92.5 |
| 1,100 | 52.91 | Trace | 9.7 | 99 |

The foregoing experiments show that atmospheres of lower ratios of chlorine to oxygen are more selective in removing nickel from laterite ores, but that such atmospheres require higher temperatures for effective nickel removal. The ore must not, of course, be heated to temperatures at which fusion commences or the nickel will begin to alloy with the iron. On the other hand, the ore must be heated to temperatures at which the nickel chloride compound formed volatilizes. I have not determined the nature of the volatilized nickel compound produced by my process, but the evidence at hand indicates that it is probably nickel chloride, $NiCl_2$. The vapor pressure of this compound at certain temperatures is tabulated in Table V.

Table V

| Temp., °C | Vapor Pressure, mm. of Mercury |
|---|---|
| 541 | 38.9 |
| 759.7 | 55.9 |
| 826.5 | 87.9 |
| 901.6 | 222.8 |
| 994.0 | 820.6 |

It may be seen that below about 500° C. there is no significant volatilization of nickel chloride, and that at about 900° C. this compound becomes highly volatile.

I have shown that the oxygen-chlorine atmosphere required by my process may be formed of gaseous chlorine and gaseous oxygen, and that atmospheric air may be used to furnish the oxygen. I have likewise found that the chlorine may be furnished by an inorganic chlorine compound which dissociates at or below the reaction temperature to release gaseous chlorine. Examples of such compounds which I have found to be effective are carbon tetrachloride, silicon tetrachloride, and sulfuryl chloride. These compounds are liquids at room temperature and may be introduced into my reaction chamber by entrainment in air or oxygen. Air for example, may be bubbled through a vessel containing carbon tetrachloride and then introduced into my reaction chamber to react with the iron ore. If conditions are adjusted so that the volumetric ratio of chlorine to oxygen corresponds with that of one of the foregoing examples, and if ore of the analysis previously set out is treated at a temperature of the example, the amounts of iron and nickel removed will be found to be substantially the same as those removed with an atmosphere formed of gaseous chlorine and air.

Organic compounds of chlorine are generally unsatisfactory for my invention, however. Such compounds release chlorine but appear to break down in other ways which inhibit the chloridization of nickel. An atmosphere formed by bubbling air through allyl chloride was introduced into a reaction chamber heated to 900° C. and there brought into contact with lateritic iron ore of the composition previously set out. After one hour's time, 30.4% of the iron had been removed but no measurable amount of nickel.

As I have mentioned, I prefer to circulate my oxygen-chlorine atmosphere through the retort or chamber in which my ore is heated at a rate sufficient to maintain a substantially constant composition of the reacting atmosphere within the chamber. In other words, the volatile nickel compounds should be removed from the reaction chamber as they are formed. If they are not, the rate of reaction will slow down and make necessary an extended heating time. I prefer to circulate my atmosphere at the rate of 5,000 to 6,000 liters per hour per kilogram of ore as I have indicated, but this rate of flow can be halved without any very significant impairment of my process.

It will be understood that the oxygen-chlorine atmosphere exhausted from my reaction chamber can be re-used if the volatile nickel and iron compounds are removed from it. If desired, the chlorine can be recovered from the iron and nickel compounds so removed and recycled. Known methods of effecting this removal and recovery are satisfactory.

I claim:

1. The process of beneficiating laterite iron ore containing a minor proportion of nickel by selectively removing nickel therefrom comprising heating said ore to a temperature sufficient to volatilize nickel chloride, forming a gaseous atmosphere comprising oxygen and chlorine, the volume of oxygen in said atmosphere being greater than the volume of chlorine, continuously bringing said atmosphere into contact with said ore during said heating whereby said nickel is reacted therewith to form a gaseous compound and said iron is substantially unreacted with said chlorine, and continuously removing from contact with said ore said atmosphere containing said gaseous nickel compound.

2. The process of claim 1 in which the gaseous atmosphere comprises not more than about 8 parts by volume of chlorine to 10.4 parts of oxygen.

3. The process of claim 1 in which the chlorine in the gaseous atmosphere is present in amounts from effective amounts up to about 8 parts by volume to 10.4 parts of oxygen.

4. The process of claim 1 in which the ore is heated to a temperature above about 900° C., but not over about 1100° C.

5. The process of claim 1 in which the gaseous atmosphere is brought into contact with the ore during heating at a rate not less than that required to maintain a reacting atmosphere of substantially constant composition.

6. The process of beneficiating laterite iron ore containing a minor proportion of nickel by selectively removing nickel therefrom comprising reacting said ore with gaseous chlorine at a temperature sufficient to volatilize nickel chloride and introducing into the reaction sufficient oxygen to inhibit the chloridization of iron.

7. The process of beneficiating laterite iron ore containing a minor proportion of nickel by selectively removing nickel therefrom comprising bringing an atmosphere of oxygen and chlorine into reacting relation with said ore, regulating the amount of chlorine present and the temperature of the reaction within limits such that said chlorine forms a volatile compound with nickel to the exclusion of iron, and removing from contact with said ore said volatile nickel-chlorine compound.

References Cited in the file of this patent

UNITED STATES PATENTS

| | | |
|---|---|---|
| 846,657 | Frolich | Mar. 12, 1907 |
| 1,111,976 | Titus | Sept. 29, 1914 |
| 1,933,702 | Brown | Nov. 7, 1933 |
| 1,936,543 | Prutton | Nov. 21, 1933 |
| 2,030,867 | Hart | Feb. 18, 1936 |
| 2,030,868 | Hart | Feb. 18, 1936 |
| 2,036,664 | Wescott | Apr. 7, 1936 |
| 2,104,741 | Fink | Jan. 11, 1938 |
| 2,733,983 | Daubenspeck | Feb. 7, 1956 |

FOREIGN PATENTS

| | | |
|---|---|---|
| 1,5962/28 | Australia | May 23, 1929 |
| 362,343 | Great Britain | Nov. 30, 1931 |
| 396,933 | Great Britain | Aug. 17, 1933 |